United States Patent
Esl et al.

(10) Patent No.: US 9,579,970 B2
(45) Date of Patent: *Feb. 28, 2017

(54) FILLER NECK ASSEMBLY WITH STOP VALVE

(71) Applicant: MAGNA STEYR Fahrzeugtechnik AG & Co KG, Graz (AT)

(72) Inventors: Oliver Esl, Graz (AT); Franz Mayr, St. Marein bei Graz (AT)

(73) Assignee: MAGNA STEYR Fahrzeugtechnik AG & Co KG, Graz (AT)

(*) Notice: Subject to any disclaimer, the term of this patent is extended or adjusted under 35 U.S.C. 154(b) by 322 days.

This patent is subject to a terminal disclaimer.

(21) Appl. No.: 14/071,864

(22) Filed: Nov. 5, 2013

(65) Prior Publication Data

US 2014/0124071 A1 May 8, 2014

(30) Foreign Application Priority Data

Nov. 5, 2012 (EP) .................... 12191298

(51) Int. Cl.
    *B60K 15/04* (2006.01)
    *F17C 13/04* (2006.01)

(52) U.S. Cl.
    CPC .............. *B60K 15/04* (2013.01); *F17C 13/04* (2013.01); *F17C 2205/0323* (2013.01);
    (Continued)

(58) Field of Classification Search
    CPC .............. F17C 13/04; F17C 2205/0332; F17C 2205/0335; F17C 2205/0373;
    (Continued)

(56) References Cited

U.S. PATENT DOCUMENTS 3,890,999 A * 6/1975 Moskow ............... F16K 31/363
    137/484.4
4,898,205 A     2/1990 Ross
(Continued)

FOREIGN PATENT DOCUMENTS

CN     101198814 A    6/2008
DE     692 00 463 T2    5/1995
(Continued)

OTHER PUBLICATIONS

Yui Tosh Ima, Japanese Patent Application No. 2013-227855 Notice of Reasons for Rejection, Nov. 4, 2014, pp. 1-2, Japanese Patent Office, Japan. (English Abstract Submitted).

(Continued)

*Primary Examiner* — Mark A Laurenzi
*Assistant Examiner* — Timothy P Kelly
(74) *Attorney, Agent, or Firm* — Jordan IP Law, LLC; Todd A. Vaughn (57) ABSTRACT

A tank neck unit for a vehicle that includes a tank neck operatively connected to a pressure accumulator system of the vehicle and which is configured for a predetermined maximum pressure which is greater than a permissible operating pressure of the pressure accumulator system. A shut-off valve is arranged in a throughflow path between the tank neck and an outlet region of the tank neck unit, the shut-off valve being configured to prevent an increase in pressure of the pressure accumulator system beyond the permissible operating pressure.

18 Claims, 5 Drawing Sheets

(52) U.S. Cl.
CPC ............... *F17C 2205/0335* (2013.01); *F17C 2205/0341* (2013.01); *F17C 2205/0373* (2013.01); *F17C 2205/0394* (2013.01); *F17C 2205/051* (2013.01); *F17C 2221/012* (2013.01); *F17C 2221/03* (2013.01); *F17C 2221/033* (2013.01); *F17C 2221/035* (2013.01); *F17C 2223/0123* (2013.01); *F17C 2223/036* (2013.01); *F17C 2250/043* (2013.01); *F17C 2250/075* (2013.01); *F17C 2260/021* (2013.01); *F17C 2260/022* (2013.01); *F17C 2270/0139* (2013.01); *F17C 2270/0168* (2013.01); *Y02E 60/321* (2013.01); *Y10T 137/86485* (2015.04)

(58) Field of Classification Search
CPC ........ F17C 2205/0394; F17C 2205/051; F17C 2250/043; F17C 2250/075; F17C 2260/021; B60K 15/04; B60K 2015/0458
USPC ......... 141/95, 197, 198, 348–350; 220/86.2; 137/493.7, 493.8, 505.13, 505.25, 599.09
See application file for complete search history.

(56) References Cited

U.S. PATENT DOCUMENTS

| | | | |
|---|---|---|---|
| 5,368,022 A | 11/1994 | Wagner | |
| 5,474,104 A | 12/1995 | Borland et al. | |
| 6,269,848 B1* | 8/2001 | Corfitsen | B67D 7/0401 141/231 |
| 7,051,772 B2* | 5/2006 | Dillon | B60K 15/04 141/94 |
| 2004/0084091 A1 | 5/2004 | Kerger et al. | |
| 2004/0231727 A1 | 11/2004 | Nomichi et al. | |
| 2010/0193045 A1* | 8/2010 | Xu | F17C 5/06 137/255 |

FOREIGN PATENT DOCUMENTS

| | | |
|---|---|---|
| DE | 600 13 383 T2 | 9/2005 |
| EP | 1 070 908 A1 | 1/2001 |
| EP | 1 561 991 B1 | 4/2007 |
| EP | 2 122 222 B1 | 6/2012 |
| GB | 2 053 437 A | 2/1981 |
| JP | S58-101062 A | 6/1983 |
| JP | 2011-247302 A | 12/2011 |
| JP | 2012-076713 A | 4/2012 |
| WO | 03/029719 A1 | 4/2003 |

OTHER PUBLICATIONS

Office Action and Search Report for Chinese Patent Application No. 201310744044.0 mailed Oct. 8, 2015, 10 pages including 5 pages of English translation.
Office Action and Search Report for Chinese Patent Application No. 201310744044.0 mailed Mar. 30, 2016, 10 pages including 6 pages of English translation.

* cited by examiner

FILLER NECK ASSEMBLY WITH STOP VALVE

CROSS REFERENCE TO RELATED APPLICATIONS

The present application claims priority 35 U.S.C. §119 to European Patent Publication No. EP 12191298.4 (filed on Nov. 5, 2012), which is hereby incorporated by reference in its entirety.

TECHNICAL FIELD

Embodiments relate to a tank neck unit for a vehicle and to a tank system with a tank neck unit.

BACKGROUND

Devices may be used, for example, in conjunction with tanks or pressure accumulator systems of vehicles in order to prevent overfilling of individual pressure accumulator vessels with fuel during a replenishing or filling operation. Various arrangements of pressure accumulator vessels and valves, and methods for the operation thereof, are known for this purpose.

Automotive pressure tank systems are currently checked prior to the refueling by a fuel-dispensing device of a filling station in respect of pressure level and tightness and are then correspondingly filled. Pressures of up to 10 bar in liquid gas systems, 200 to 300 bar in natural gas systems and 200 to 700 bar in hydrogen systems are customary as the filling pressure.

For hydrogen-operated vehicles, 350 and 700 bar are currently provided at filling stations. The different pressure levels of the pressure systems in vehicles are produced by tank necks of differing length. The length of the tank necks is designed in such a manner that a vehicle equipped for 350 bar cannot be replenished at a 700 bar filling station, but may be conversely. Tank systems of 700 bar are configured up to 875 bar in order not to be damaged due to thermally induced positive pressure or due to pressure surges (especially at the beginning of the replenishing operation). Several manufacturers arrange the tank and valves in such a manner that the filling line is connected directly into a valve block or is connected in parallel or in series into a plurality of valve blocks and the gas flows first through the valve blocks into the accumulator or the accumulators. Time and again in this case valves, valve seats and seals are damaged or the individual components in the valve block are caused to vibrate.

For motor vehicles operated with natural gas, there is currently a multiplicity of different refueling connections which are dependent on the type of motor vehicle (passenger vehicle, bus, lorry) and the country. (For example, ACME, bayonet or dish connection). A standard euro nozzle for Europe is planned.

Due to the relatively small ranges of vehicles operated purely by gas, an increase in the pressure level in Europe is being considered in the case of filling pressures for compressed natural gas (CNG) and mixed gas (for example, CNG and $H_2$). This would mean that, in addition to the currently customary 200 bar tank systems, in the future, 248 or possibly 300 bar CNG systems and fuel-dispensing devices would be provided at filling stations. In the United States, the permissible operating pressure for CNG systems is 248 bar.

When refueling with natural gas, however, even in Europe, a pressure level of, for example, 260 bar in a 200 bar CNG tank system in a motor vehicle may be reached, since, at the beginning of refueling, there is a pressure surge for determining leaks and the current pressure level in the accumulator system. Moreover, the pressure accumulator vessel in the vehicle may therefore be filled up to a maximum pressure of the fuel-dispensing device (260 to 265 bar in the case of CNG) by refueling starts being repeated a number of times. This means a 30% exceeding of the permissible operating pressure of 200 bar. In order to avoid a safety risk, tank systems of motor vehicles already have to be configured now for 265 bar.

Filling stations have differently functioning or non-functioning monitoring systems for monitoring leakage and pressure and for switching off the fuelling operation. Fuel-dispensing devices at filling stations have customarily indicated the refueling quantity, but often not any pressure, for CNG.

U.S. Pat. No. 5,474,104 A discloses a tank cut-off valve construction which permits rapid, effective and reliable refueling of vehicles driven by CNG. The tank shut-off valve construction also permits expansion of the vehicle fuel system before maintenance and servicing of the vehicle. The tank cut-off valve construction has a receptacle which is suitable for fitting to a fuel-dispensing device of a filling station, and has a valve body with first and second gas flow passages. The corresponding first ends of the first and second gas flow passages are connected to the receptacle while the corresponding second ends of the first and second gas flow passages are connected to a gas accumulator vessel via a fuel supply line. The cut-off valve is positioned in the first gas flow passage of the valve body and is normally prestressed into a closed position in order to prevent gas flow through the first gas flow passage. The cut-off valve opens under pressure in response to a fuel flow by permitting gas flow to the fuel accumulator vessel.

A preferred embodiment of the tank cut-off valve construction disclosed in U.S. Pat. No. 5,474,104A furthermore has a bypass valve in the second gas flow passage in the valve body. The bypass valve is normally located in a closed position in which it blocks gas flow through the second gas flow passage. If maintenance or replacement of one or more parts of the construction is required, the bypass valve may be opened in order to permit gas flow back from the gas accumulator vessel through the receptacle, so as to empty the fuel system of a vehicle prior to maintenance. The receptacle may also have a filter in order to remove particles from the fuel. Due to the positioning of the cut-off valve within the valve body, the receptacle is not under pressure and may easily be removed for maintenance or replacement of the filter. The tank shut-off valve construction, however, lacks any device whatsoever for limiting the pressure in the pressure accumulator system.

European Patent Publication No. EP 1 561 991 B1 discloses a receiving element of a rapid-action coupling and a rapid-action coupling for the releasable connection of two pressurized fluid lines, and a system for filling car vessels with pressurized gas, the system comprising such a receiving element. Within this context, European Patent Publication No. EP 1 561 991 B1 discloses a rapid-action coupling for the releasable connection of two lines through which a pressurized fluid flows, the coupling comprising a plug-in element and a receiving element which are suitable for plugging axially one into the other. The plug-in element is equipped with a seal which is arranged in a receptacle which is incorporated in the inner surface of the body of the element, while the receiving element is provided with a closure valve. The valve is opened by a reaction force exerted by the seal of the plug-in element, the force resulting from the valve being supported on the seal as a consequence of the plug-in element and the receiving element intermeshing. The receiving element is therefore open by the valve being displaced only on account of the interaction between the valve and the seal of a plug-in element.

The intermeshing of the plug-in element and the receiving element does not result in the valve being displaced in the opening direction in the absence of the seal in the receptacle of the plug-in element. In particular, a rapid-action-coupling receiving element which belongs to such a coupling, and a rapid-action-coupling receiving element which is provided with a closure valve are disclosed. The valve is opened by a reaction force exerted by a seal arranged in an inner receiving space of the body of a coupling plug-in element which is suitable for being plugged into the receiving element. The force results from support of an outer circumferential slope or a transition zone between the end surface and a radial outer surface of the valve as a result of the plug-in element and the receiving element intermeshing.

European Patent Publication No. EP 2 122 222 B1 discloses a receiving or plug-in element of a coupling which serves for the releasable connection of pressurized lines through which a fluid flows, each connecting piece having a constant cross section over the entire length thereof.

European Patent Publication No. EP 1 561 991 B1 and European Patent Publication No. EP 2 122 222 B1 are representative of a number of known devices and technical solutions for the problem of reliable mechanical coding device between a fuel-dispensing device (e.g., fuel nozzle) of the filling station and tank neck of the motor vehicle. Problems, such as a small dead volume of the coupling, and embodiments of the frequently integrated nonreturn valves are also disclosed.

The solutions known in the prior art, however, lack any reliable devices for limiting the pressure in a tank system.

In order to reduce the multiplicity of tank necks and connections to fuel-dispensing devices of filling stations and to increase the operating reliability, a tank neck unit which is usable not only for different geographical regions but also limits the filling pressure in accordance with the permissible operating pressure of a tank system is proposed.

In the publications hereinabove mentioned, it is desirable for a permissible operating pressure of a pressure accumulator vessel or of a tank system to be reliably maintained over the course of a filling operation and thus to ensure maximum operating reliability. The filling operation is intended to be able to be carried out as rapidly as possible and with only low energy losses. Wear to valve components is intended to be kept low and damage to pressure accumulator vessels and pressure lines is intended to be prevented.

It is currently prohibited from replenishing at filling stations, the refueling pressure (nozzle pressure) of which exceeds the maximum working pressure of the pressure accumulator vessels installed in a vehicle.

SUMMARY

In accordance with embodiments, tank systems for vehicles having an enhanced structural design is provided.

In accordance with embodiments, tank neck units and combined valve arrangements are provided which, even without the use of electric and electronic components, increase safety when refueling tank systems.

Embodiments relate to a tank neck unit for a vehicle, having at least one of: a tank neck configured for a predetermined maximum pressure which is higher than a permissible operating pressure of a pressure accumulator system arranged in the vehicle; a throughflow path; a nonreturn valve; and a shut-off valve arranged in the throughflow path between the tank neck and an outlet region of the tank neck unit and which is configured to protect the pressure accumulator system arranged in the vehicle against an increase in pressure beyond the permissible operating pressure thereof.

Embodiments relate to a tank neck unit for a vehicle having a pressure accumulator system, the tank neck unit having at least one of: a tank neck configured for a predetermined maximum pressure which is greater than a permissible operating pressure of the pressure accumulator system; a throughflow path; a nonreturn valve; and a shut-off valve arranged in the throughflow path between the tank neck and an outlet region of the tank neck unit, the shut-off valve being configured to prevent an increase in pressure of the pressure accumulator system beyond the permissible operating pressure.

Embodiments relate to a tank system for a vehicle, having at least one of: a pressure accumulator; and a tank neck unit operatively connected to the pressure accumulator, the tank neck unit having a tank neck configured for a predetermined maximum pressure which is greater than a permissible operating pressure of the pressure accumulator system, a throughflow path, a nonreturn valve; and a shut-off valve arranged in the throughflow path between the tank neck and an outlet region of the tank neck unit, the shut-off valve being configured to prevent an increase in pressure of the pressure accumulator system beyond the permissible operating pressure.

Embodiments relate to a tank neck unit having at least one of: a tank neck operatively connected to a pressure accumulator system and configured for a predetermined maximum pressure which is greater than a permissible operating pressure of the pressure accumulator system; a shut-off valve arranged in a throughflow path between the tank neck and an outlet region, the shut-off valve being configured to prevent an increase in pressure of the pressure accumulator system beyond the permissible operating pressure; and a pressure indicator configured to respond to and/or indicate when a maximum shut-off pressure of the shut-off valve is reached.

Embodiments relate to a pressure accumulator system having at least one of: at least one pressure accumulator vessel; pressure lines and other components which are arranged downstream of the tank neck unit in the vehicle and come into contact with the fluid medium used as the fuel. The shut-off valve may be open in the normal state, i.e., without pressure in the feed line and when a refueling operation is not taking place, in order to provide as little flow resistance as possible to the fluid medium flowing in during the refueling operation. The entire throughflow path of the tank neck unit is closed only by a nonreturn valve arranged in the throughflow path directly downstream of the tank neck. The shut-off valve is designed so as, in the event of a rise in the pressure in its outlet region facing the pressure accumulator system of the vehicle, reversibly to close the throughflow path of the tank neck unit when a shut-off pressure is reached and thus to protect the pressure accumulator system arranged in the vehicle against a rise in pressure beyond the permissible operating pressure thereof. This enables rapid and safe refueling.

Embodiments relate to a tank system for a vehicle having at least one of: a tank neck unit, pressure lines and at least one pressure accumulator vessel.

The use of monitoring devices or sensors which monitor a defined shut-off pressure purely mechanically, the devices being permanently operatively connected to individual sub-regions of a pressure accumulator system, yields a high level of protection against erroneous refueling and effective protection against an impermissible rise in pressure in the tank system.

Systems which perform monitoring purely electronically may bring about dangerous states in the tank system due to erroneous pressure measurements and/or switching operations at electromagnetic valves. Therefore, mechanical and/or electric/electronic components are preferably also used together, as additional safety devices, in tank systems in accordance with embodiments.

In accordance with embodiments, the tank neck may have mechanical dimensions and/or other coding devices such that the tank neck is connectable to all fuel-dispensing devices which provide fuel/medium up to a maximum nozzle pressure available at filling stations (in the future, for example, 700 or 900 bar).

In accordance with embodiments, a monitoring device which is operatively connected upstream of a pressure accumulator system having a specific reliable operating pressure and is arranged in a tank neck unit and has a shut-off pressure defined by the specific reliable operating pressure of the pressure accumulator system may take the form of, for example, a shut-off valve. The shut-off valve in accordance with embodiments may have a valve housing, a valve chamber with an intake opening and an outlet opening facing the pressure accumulator system, a moveable piston, and at least one bias mechanism such as, for example, a spring.

The piston may have at least one axial connecting channel and is guided in an axially moveable manner by at least two sealing elements arranged in the valve chamber. A first effective piston surface of the piston faces an inlet region of the valve chamber. A sealing body or a valve housing form a valve seat. By changing the pressure in an accumulator region of the valve chamber, which accumulator region being adjacent to a second effective piston surface, the piston is axially moveable and a passage opening arranged between the intake opening and the outlet opening may be reversibly closed and opened. In an unpressurized state, the passage opening is kept open by the bias mechanism.

Advantageously, this results in a purely mechanical shut-off valve which, due to a set spring force, tightly and effectively closes the passage opening from a specific pressure and which does not open either in the case of a further increase in pressure or reduction in pressure due to negative pressure in the intake opening, and thus, always remains closed. Fluid media may therefore be extracted at one or more other locations in the pressure accumulator system.

The advantage of such a purely mechanical shut-off valve resides, in the case of the filling operation, in that a downstream pressure accumulator system reaches only a desired pressure and is independent of the pressure upstream of the shut-off valve. The shut-off valve in accordance with embodiments always remains reliably closed without use of an electromagnetic actuator, and thus, reliably maintains the pressure in the downstream pressure accumulator system and does not permit a further increase in pressure due to fluid media flowing in after.

A further advantage of the shut-off valve design resides in the fact that, although in the event of leakage at the sealing seat between piston and sealing body or valve housing, the downstream pressure accumulator system may be exposed to an undesirable increase in pressure, as the pressure on the outlet side increases the contact pressure force of the piston against the sealing body or the valve housing increases and therefore the leakage is reduced again.

It is particularly advantageous that, in an unpressurized state, the passage opening is kept open by the force of the spring. The fluid medium may therefore flow unobstructed into the pressure accumulator system until the end phase of the replenishing operation and harmful vibrations in the region of the valve chamber are avoided.

In accordance with embodiments, advantageously, the shut-off valve is configured such that, if the first effective piston surface and the sealing body or the valve housing of the shut-off valve are configured in such a manner that, in a closed position of the piston, a sealing effect occurs at a sealing edge in the region of the outer border of the first effective piston surface. "Outer border" here means lying radially on the outside, as viewed from the axis of the piston. The outer border of the piston may have a geometric shape or cross-section which is obliquely beveled or rounded, for example, in the region of the first effective piston surface. The first effective piston surface may also have a raised bead on the outer border in order to localize the sealing effect in this region.

The shut-off valve is further configured such that, when a shut-off pressure is exceeded or when the pressure rises above the shut-off pressure, force is no longer exerted on the piston counter to the closing direction of the piston. The shut-off pressure and the closing behaviour of the shut-off valve(s) in accordance with embodiments are therefore independent of the pressure in the intake opening. In addition, when the valve is closed, axial force cannot be exerted on the piston by the pressure in the intake opening even if there is a rise in pressure in the intake opening, and the shut-off valve remains securely closed even in the event of extreme pressure surges.

Advantageously, it is also ensured that the shut-off valve and/or the pressure shut-off valve unit remains closed even if the pressure in the intake opening drops below the shut-off pressure at which the piston has previously closed, since the closing force then continuing is substantially determined only by the pressure in the accumulator region of the valve chamber on the effective piston surface minus the spring force of the spring.

Advantageously, due to the fact that the intake opening opens radially outside the effective piston surface into the inlet region of the valve chamber, it is additionally ensured that an axial force cannot be exerted on the piston by the pressure in the intake opening.

The shut-off pressure of the shut-off valve is determined by the spring force of the spring and the effective piston surfaces. The second effective piston surface may have a larger surface area than the first effective piston surface. A relatively larger second effective piston surface makes it possible to realize smaller values for the shut-off pressure of the shut-off valves.

The piston of the shut-off valve is cylindrical and the outer side thereof may have sliding surfaces in at least two regions having different diameters.

The at least two sealing elements are particularly arranged in corresponding clearances in the valve housing. One most cost-effective alternative is to accommodate the sealing elements in one groove each in the piston. Sealing elements arranged in grooves on the piston prove problematic at very high pressures (200 to 1000 bar). Depending on the pressure, a variable force is exerted on the piston, and therefore, influences the shut-off pressure of the shut-off valve. By way of the arrangement of the seals in clearances or grooves in the valve housing, in particular, in cylindrical sections of the valve chamber, the piston is not subjected to a variable action of force by the pressure of the medium, and the shut-off valve and/or the pressure shut-off valve unit remain reliably closed.

The sealing body and/or the piston may be produced from an elastically deformable material. By way of a selection of material adapted to the very high pressures (200 to 1000 bar), the sealing effect is optimized and wear at the valve seat avoided. Particularly suitable materials include plastics, such as PEEK and PAS, or ceramic materials, such as aluminium oxide and silicon carbide, but also special steels and other metals. The shut-off valves do not have to have a separate sealing body. It is also possible for the piston to be sealed directly against the valve housing. Preferred combinations of material are familiar to a person skilled in the art.

A relief region of the valve chamber, which relief region being arranged between the inlet region and the accumulator region of the valve chamber, may have a relief opening between the at least two sealing elements. As a result, medium emerging in the event of leakages at one of the sealing elements cannot result in an increase in pressure in the other region in each case of the valve chamber.

In accordance with embodiments, the relief opening may be connected to a line for disposing of emerging fluid medium. In this way, (combustible) fluid medium which may emerge may be transported away from the immediate vicinity of the shut-off valves and treated further at low pressure at a suitable location without risk to vehicle occupants.

In accordance with embodiments, the shut-off pressure of the shut-off valve(s) substantially corresponds, directly correlates to, or is otherwise determined by the spring force of the spring and the effective piston surfaces. The spring force of the spring is dimensioned in coordination with the effective piston surfaces in such a manner that, as the pressure in the accumulator region rises, the shut-off valve reliably closes and remains closed after a predetermined shut-off pressure has been exceeded. The friction at the sealing elements is also important in the dimensioning of the spring force.

In accordance with embodiments, the spring force of the spring may be adjustable via the screw-in depth of a cover. In this way, differences in the friction between piston and sealing elements, for example, caused by manufacturing tolerances, may be compensated for during assembly, for example.

In accordance with embodiments, in the shut-off valve, spacers may be provided spatially on and/or over the cover of the valve housing or corresponding recesses are provided spatially on and/or over the second effective piston surface of the piston. This achieves good distribution of pressure to the second effective piston surface of the piston.

In accordance with embodiments, the tank neck unit may include a shut-off valve and a pressure control valve arranged in a common valve housing. The pressure control valve, which may have an opening pressure which lies (just) above the shut-off pressure of the shut-off valve or the pressure shut-off valve unit, is arranged between the accumulator region and the relief region of the valve chamber.

In accordance with embodiments, the pressure control valve may be arranged integrated in the piston, which advantageously increases the operating reliability of the tank system. Since the shut-off valve in the tank neck does remain closed, without a pressure control valve of this type, overheating of the medium, caused, for example, by a fire, and a resulting rise in pressure in the pressure accumulator system would result in destruction of the pressure accumulator system or of individual components of the pressure accumulator system.

The shut-off valve in accordance with embodiments may be arranged directly downstream of the nonreturn valve in the throughflow path of the tank neck unit.

In accordance with embodiments, the tank neck unit may be fixedly connected to the vehicle, and have a tank neck arranged on the outer side of the vehicle, the tank neck being defined by the type of fuel permissible for the vehicle and/or by a predetermined maximum pressure for the fuel permissible for the vehicle. The outlet opening of the shut-off valve arranged in the tank neck unit may be connected via a pressure line to the pressure accumulator system in the vehicle, and the shut-off pressure of the shut-off valve may be determined by the permissible operating pressure of the pressure accumulator system.

In accordance with embodiments, the tank neck unit may be permanently and fixedly fitted in the region of the outer covering/body of the vehicle in order to protect the pressure lines which lead to the pressure accumulator system of the vehicle, against the positive pressure prevailing during refueling. The tank neck unit is therefore also assigned fixedly to the vehicle, and the tank neck which is coordinated with the fitted pressure accumulator system and the shut-off valve which is likewise coordinated with the permissible operating pressure of the pressure accumulator system permit safe refueling without the risk of mix-up and errors. An adapter which may be fixedly related to the vehicle greatly increases the safety and, in various embodiments of the connections for the filling stations, may take on the level of safety required even for filling station systems in foreign regions.

In accordance with embodiments, the tank neck unit is configured as a mobile adapter that includes a tank neck on the filling-station side, the tank neck being defined by the type of fuel permissible for the vehicle and by a predetermined maximum pressure of the fuel permissible for the vehicle. The tank neck unit may have, on the vehicle side, a connector which is defined by the shut-off pressure of the shut-off valve arranged in the tank neck unit. The design as a mobile adapter permits the simple retrofitting of vehicles with conventional tank systems. Due to the fact that the mechanical dimensions of the vehicle-side connector of the mobile adapter are defined by the shut-off pressure of the shut-off valve arranged in the mobile adapter, and the tank neck of a conventional tank neck unit fitted permanently into the vehicle is defined by the permissible operating pressure of the pressure accumulator system fitted in the vehicle, it is ensured that the mobile adapter may be plugged only onto vehicles which coincide in type of fuel and permissible operating pressure with the mobile adapter. A mobile adapter/tank neck of this type may be carried along in the vehicle by the owner. The safety during refueling is increased and regional characteristics at filling stations may be better taken into consideration.

In accordance with embodiments, the tank neck unit may have a switchable throughflow-limiting valve mounted in the throughflow path upstream of the shut-off valve. With a valve which is integrated into the tank neck unit and may have defined throughflow openings which are switchable mechanically or electrically, the pressure surge at the beginning of replenishment may be damped. As the replenishing operation continues, short replenishing times are achieved via the second, larger cross section. This avoids damage to valves, valve seats and seals due to pressure surges.

The throughflow-limiting valve may have, for example, two switching positions. During refueling, in order to protect the pressure accumulator system or the components thereof against possible pressure surges of the filling station, a start may be made with a reduced pressure flow cross section of the valve and, subsequently, a switch may be made manually (or electrically) to the larger cross section so that the refueling may take place more rapidly.

The tank neck unit may have a pressure indicator operating mechanically and/or electrically and being visually perceptible. The adapter is equipped with a visually perceptible pressure indicator in order to signal to the person undertaking the refueling that the pressure tank is now full or the reliable operating pressure of the tank has been reached. The visually perceptible pressure indicator may be configured to be responsive only when the shut-off pressure of the shut-off valve is reached or is at its indicating maximum when the shut-off pressure is reached. This increases the safety of users and also a petrol pump attendant during a refueling operation.

In accordance with embodiments, advantageously, the tank neck unit may have a colour coding device configured to visually indicate the type of permissible fuel and/or the shut-off pressure of the shut-off valve. In addition, it is advantageous if the tank neck unit may have an alpha-numerical identification device configured to visually indicate the type of permissible fuel and/or the predetermined maximum pressure and/or the shut-off pressure of the shut-off valve. With an additional, coloured identification device corresponding to the type of fuel and/or a defined identification device by way of a label (with indicia, letters, and/or numbers), an increase in the safety during refueling may be achieved.

The shut-off valve(s) in accordance with embodiments are particularly suitable for different fluid media, such as hydrogen, methane, natural gas or a mixture of hydrogen and natural gas. By way of appropriate modifications, use with liquid gas (LPG) and other fluid media is also possible.

In accordance with embodiments, in the tank system, at least one pressure accumulator vessel may be assigned at least one electromagnetically actuable cut-off valve which is controllable by a control unit. The electromagnetically actuable cut-off valve may be an automatic cylinder valve (ACV) which is actuated electrically or electromagnetically (e.g. by way of a magnet) and which may be opened and closed. In tank systems of this type, the valve is often referred to as a "shut-off valve" or gas-pressure shut-off valve. Electromagnetically actuable cut-off valves in valve arrangements generally serve for the opening and closing of pressure accumulator vessels. The cut-off valves may be conventionally designed so as to be closed when the actuating mechanism thereof is in a deenergized state. The expression used here, automatic cylinder valve, originates from an ECE guideline that uses this expression for a valve of this type. The ACV may shut off/open a downstream pressure accumulator vessel independently of the prevailing pressure, and ensures additional safety during the operation of tank systems.

A "refueling operation" involving a plurality of pressure accumulator vessels encompasses, in particular, the period of time in which the highly compressed gas is delivered into the pressure accumulator vessels. "Simultaneous refueling," for example, at a fuel pump of a natural-gas refueling facility (filling station), of a plurality of pressure accumulator vessels is the opposite to a sequential refueling of the pressure accumulator vessels. Accordingly, the refueling of the plurality of pressure accumulator vessels takes place via parallel feed lines which are coupled to a common filler/tank neck such that the highly compressed gas may be fed simultaneously/in parallel to the plurality of pressure accumulator vessels.

DRAWINGS

Embodiments will be illustrated by way of example in the drawings and explained in the description below.

DESCRIPTION

Figure 1:
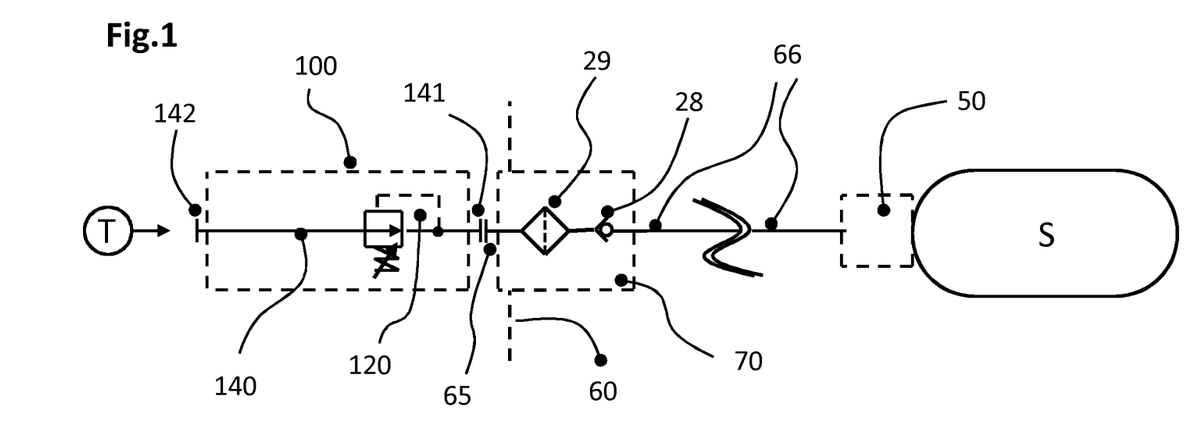
FIG. 1 illustrates schematically a mobile tank neck adapter in conjunction with a tank neck unit in a pressure accumulator system.

FIG. 1 illustrates, by way of example a mobile tank neck unit 100 in conjunction with a tank neck unit 70 and a pressure accumulator system, which are spatially arranged within the region of the body 60 of a motor vehicle. The starting position during the refueling of the system is such that the shut-off valve 120 arranged in the throughflow path 140 between the (mobile) tank neck 142 and the (mobile) connector 141 is kept open by a bias mechanism, such as, for example, a spring 23 (see FIG. 6). The mobile tank neck unit 100 is operatively connected to the tank neck 65 of the tank neck unit 70 via the connector 141. For refueling, the fuel-dispensing device of a filling station T may be operatively connected to the mobile tank neck 142. Fuel/medium may then flow through the throughflow path 140, the shut-off valve 120, the filter 29 and the nonreturn valve 28 via the pressure line 66 and via an accumulator valve block 50 into the pressure accumulator S.

Figure 2:
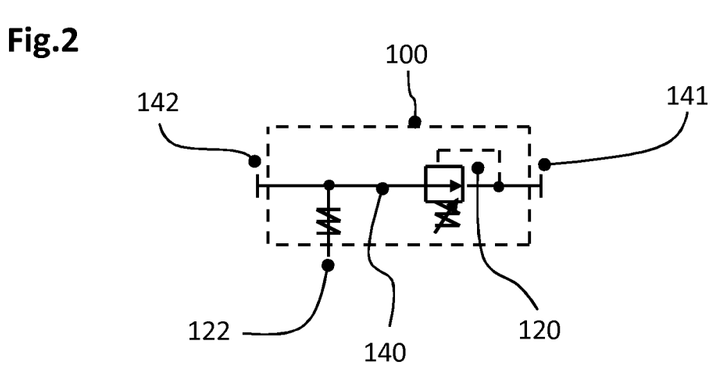
FIG. 2 illustrates schematically a mobile tank neck adapter with an integrated shut-off valve and an opto-mechanical pressure indicator.

FIG. 2 schematically illustrates a circuit diagram for a mobile tank neck unit 100 having an integrated pressure indicator 122. The pressure indicator 122, arranged between tank neck 142 and shut-off valve 120 may, during refueling, be configured to signal to a user carrying out a refueling operation that the tank is now full and the permissible operating pressure of the pressure accumulator system arranged in the vehicle has been reached. For a tank of 200 bar, the pressure indicator 122 may be set, for example, to 195 bar and, at this pressure, an indicating element may be extended so as to be visible to the user carrying out the refueling operation. Therefore, if the tank of 200 bar is filling slowly with a 700 bar fuel-dispensing device during the refueling operation, and the pressure rises, either the pressure shut-off valve 120 closes, and then the pressure at the pressure indicator 122 abruptly rises to 700 bar, or the pressure indicator is set to a lower pressure than the pressure shut-off valve 120 and the bolt extends just before the pressure shut-off valve 120 closes. When the tank nozzle is removed, the indicating element of the pressure indicator 122 returns back again into the starting position.

An advantage over conventional designs of tank neck units currently on the market is that such tank neck units lack a simple manner of visually signaling to a user carrying out a refueling operation that the tank is full. Conventionally, the filling station itself establishes, on the basis of pressure surges or elicited pressure changes in the refueling line, that the tank is presently full. The user carrying out the refueling operation in this case does not have any direct visual indication, and therefore, no direct manner of determining whether the tank is full.

Figure 3:
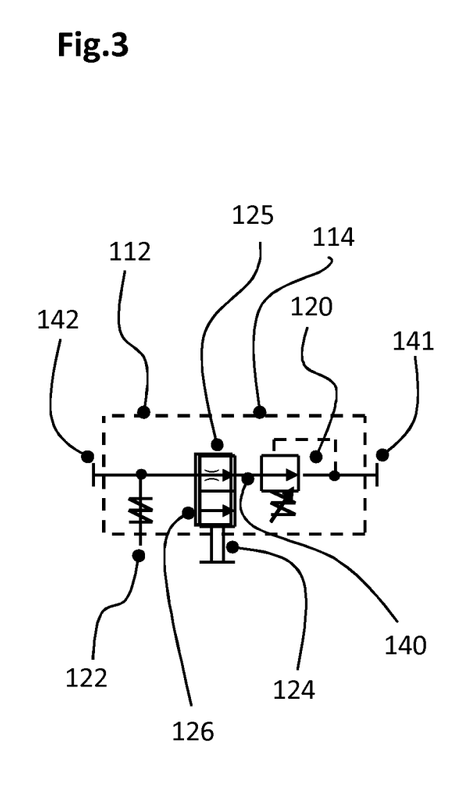
FIG. 3 illustrates schematically a mobile tank neck adapter with a plurality of integrated auxiliary devices.

FIG. 3 illustrates schematically a mobile tank neck unit having a pressure indicator 122, a throughflow-limiting valve 124 and a shut-off valve 120 arranged integrated in a housing as a functional unit. The pressure indicator 122 operatively functions as the pressure indicator illustrated in FIG. 2. The manually or electrically actuable throughflow-limiting valve 124 may be configured in such a manner that, in a first switching position 125, the throughflow of fuel is limited, and therefore, pressure surges are also damped. In a second switching position 126, a larger cross-section is opened up for rapid refueling. On the outside of the schematically illustrated housing, a coloured indication device 112 on the mobile adapter indicates the permissible type of fuel and/or the shut-off pressure of the fitted shut-off valve 120 and/or the maximum pressure which may be applied at the tank neck, and therefore, on the tank neck unit. Connector 141 and tank neck 65, 165 fixedly installed in the vehicle may also be identified in colour by the same internationally agreed coding system. An alpha-numerical identification device 114 (of pressure and type of fuel) is also indicated schematically on the outside of the mobile tank neck unit.

Figure 4:
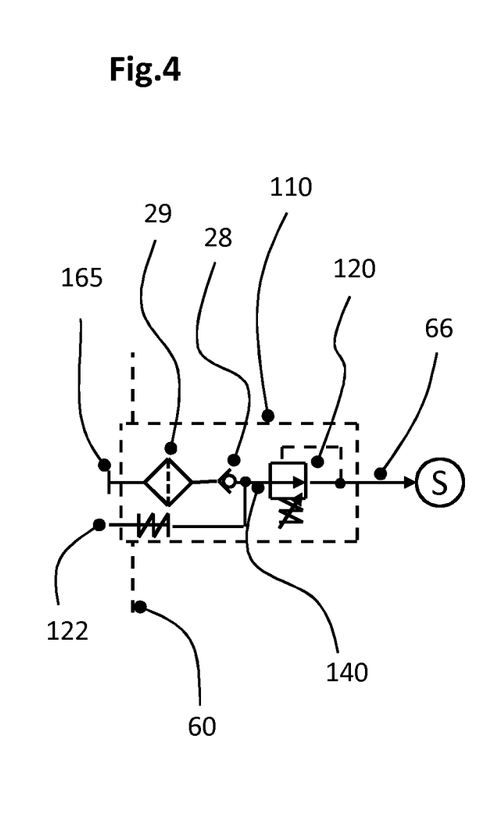
FIG. 4 illustrates schematically a tank neck adapter which is fixedly fitted into a vehicle and may have an integrated shut-off valve and an opto-mechanical pressure indicator.

The tank neck unit 110 illustrated in FIG. 4 may be permanently and fixedly fitted into a vehicle within the region of the body. The pressure indicator 122 illustrated next to the tank neck 165 may have the same operational function as in the mobile tank neck unit illustrated in FIG. 3. Here, however, the pressure indicator 122 may also indicate the filling pressure prevailing on account of the nonreturn valve 28 after the fuel-dispensing device has been removed and the pressure indicating 122 will remain extended until, on account of the withdrawal of fuel, the pressure in the tank system drops below the shut-off pressure of the shut-off valve 120, the latter then opens and, as a result, the pressure at the pressure indicator 122 is also reduced.

Figure 5:
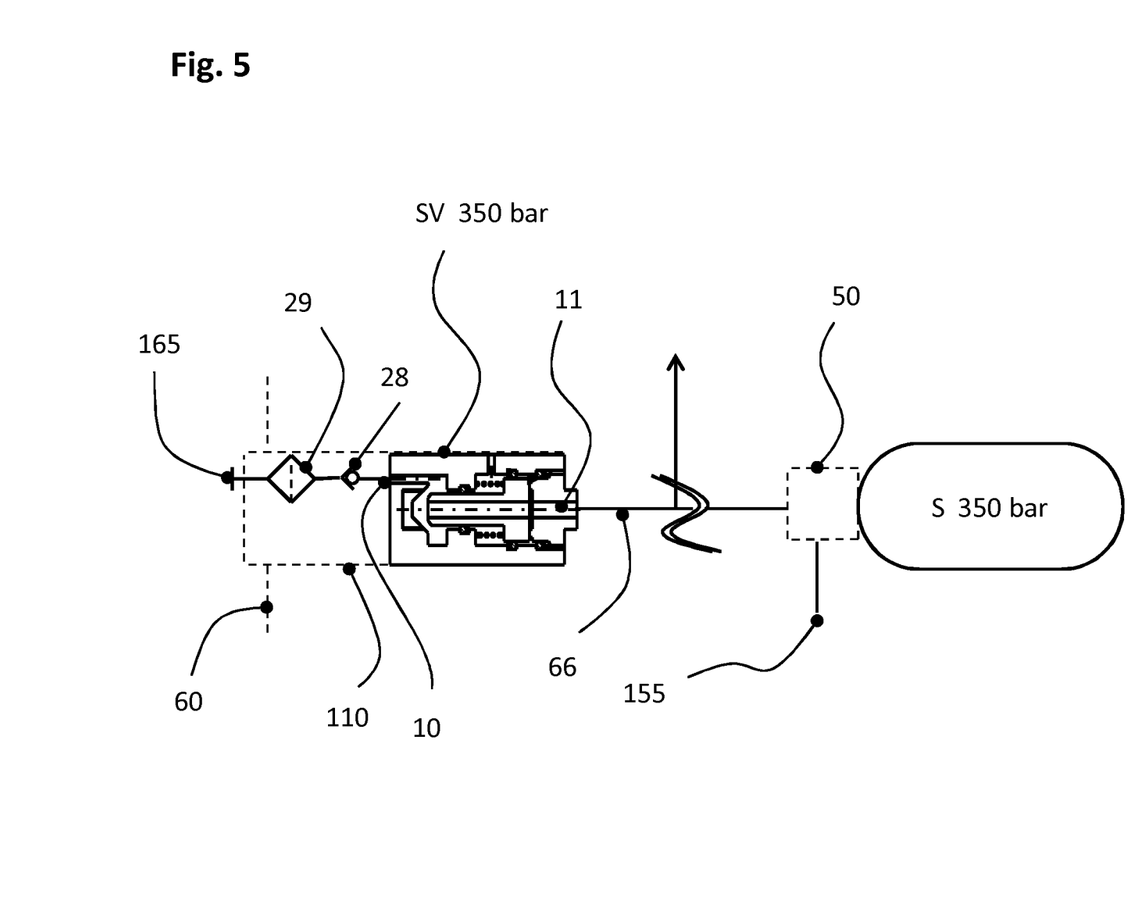
FIG. 5 illustrates a schematic illustration of a tank neck unit for a vehicle with an integrated shut-off valve and a pressure accumulator vessel.

FIG. 5 illustrates an exemplary embodiment of the shut-off valve SV (shut-off pressure 350 bar) fitted into a tank neck unit 110 in a body 60 of a vehicle. The mechanical dimensions (length, diameter) of a tank neck 165 define as to which fuel nozzle of a filling station the tank neck 165 is connectable. This makes it possible to define the fluid medium/fuel which may be replenished. The maximum possible applicable pressure is the maximum fuel-dispensing pressure available at a filling station for a particular fuel. During the filling operation, the fuel flows through a filter 29 and a nonreturn valve 28 into the inlet opening 10, arranged axially, of the shut-off valve SV, which is configured for a shut-off pressure of 350 bar. From the outlet opening 11 of the shut-off valve SV, the fuel then passes at a maximum pressure of 350 bar via a pressure line 66 and via an accumulator valve block 50 (which may have an additional safety valve and/or a pressure regulator for withdrawing medium) into a pressure accumulator vessel S which has a permissible operating pressure of 350 bar. By coordinating the shut-off pressure (350 bar) of the shut-off valve SV with the permissible operating pressure of the pressure accumulator vessel S and by the permanently connected arrangement of the components in the vehicle, safe refueling irrespective of the fuel-dispensing pressure of the filling station is ensured. The tank system may be emptied by a pressure regulator integrated in the accumulator valve block 50 and a withdrawal location 155 to a user. Fluid media may also be withdrawn at one or a plurality of other pressure accumulator system locations connected downstream of the shut-off valve SV.

Figure 6:
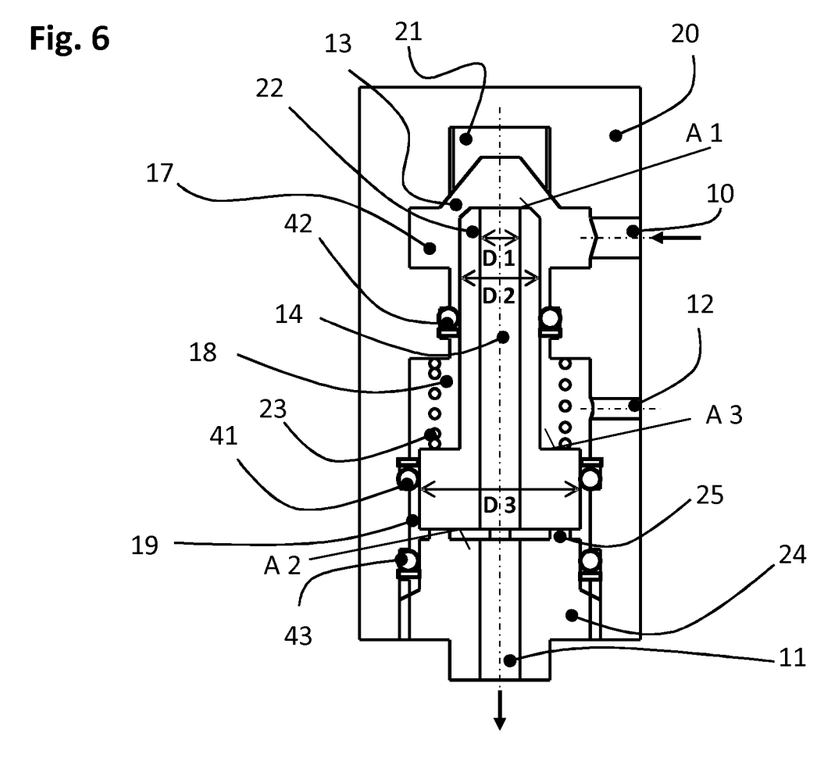
FIG. 6 illustrates a sectional view of a shut-off valve in accordance with embodiments.

As illustrated in FIG. 6, the shut-off valve SV, 120 in accordance with embodiments may include piston 22 which may have two sections having different outside diameters D2, D3 and a connecting channel 14 which is in the form of a central hollow bore and may have the inside diameter D1 is mounted in a valve housing 20. The piston 22 may be supported at the transition to the larger outside diameter D3 via the support A3 by a bias mechanism such as, for example, a spring 23 on the valve housing 20, as a result of which the piston 22 is kept in contact with the cover 24 and the passage opening 13 is thereby kept in an open position in an unpressurized fitted state.

As also illustrated in FIG. 6, the piston 22 may have two sections having different outside diameters D2 and D3. A first piston section may have a first effective piston surface A1 formed normally to the axis of the piston 22, a sealing edge 39 formed as a bevel on an edge of the piston, and a first sliding surface having an outside diameter D2. A second piston section may have a second effective piston surface A2, a support A3 for the spring 23 and a second sliding surface having an outside diameter D3. The connecting channel 14 is in the form of an axial bore over the entire length of the piston 22 and may have an inside diameter D1. The connecting channel 14 connects the two effective piston surfaces A1, A2 and medium flows therethrough in accordance with embodiments of the valve housing 20 and the operating state of the shut-off valve.

The piston 22 may be sealed by sealing elements 41, 42 in the two sections having different outside diameters D2, D3 in such a manner that the space with the spring 23 between the seals may breathe freely through the ventilation opening 12 to the atmospheric pressure. The sealing elements 41, 42 may be mounted either in the piston 22 or, as illustrated, in the valve housing 20. The sealing 43 seals off the adjustable cover 24 from the valve housing 20.

During a filling operation, for example, of a pressure accumulator vessel arranged at the outlet opening 11, a fluid medium may pass through the intake opening 10 in the inlet region 17 of the valve chamber via the passage opening 13 and through the connecting channel 14 into the accumulator region 19 of the valve chamber and, in consequence, through the outlet opening 11 into the following pressure accumulator vessel S. If the pressure in the tank system rises to such an extent that, because of the force ratios due to the pressure prevailing at the effective piston surfaces A2 and A1, the piston 22 overcomes the spring force 23, the piston 22 is pushed against the sealing body 21. The shut-off valve SV, 120 closes. This pressure corresponds to the shut-off pressure.

In order not to obtain any further pressure force on the piston 22, it is therefore advantageous if the piston 22 is sealed off on the outer diameter D2 with respect to the sealing body 21. In the event of a rising pressure in the inlet region 17, the shut-off valve SV, 120 continues to remain closed since the increase in pressure no longer acts on the first effective piston surface A1. If the pressure in the inlet opening 10 drops below the pressure at which the piston 22 has closed, the valve SV, 120 nevertheless remains closed, since the closing force is determined by the pressure in the outlet opening 11 on the effective piston surface A2, minus the spring force of the spring 23, and this state has not changed. It is therefore possible to apply negative pressure on the inlet side 10 without the valve SV, 120 opening as a result.

The spring force of the spring 23 is additionally adjustable by the screw-in depth of the cover 24. In order to obtain enhanced distribution of pressure to the second effective piston surface A2, either spacers 25 may be provided on and/or over the cover 24 or corresponding recesses may be provided on and/or over the piston 22. The shut-off valve SV, 120 opens only if the pressure in the outlet opening 11 drops as a result of the fact that medium is withdrawn in the following system via a separate location and, as a result, the pressure drops below the shut-off pressure.

Figure 7:
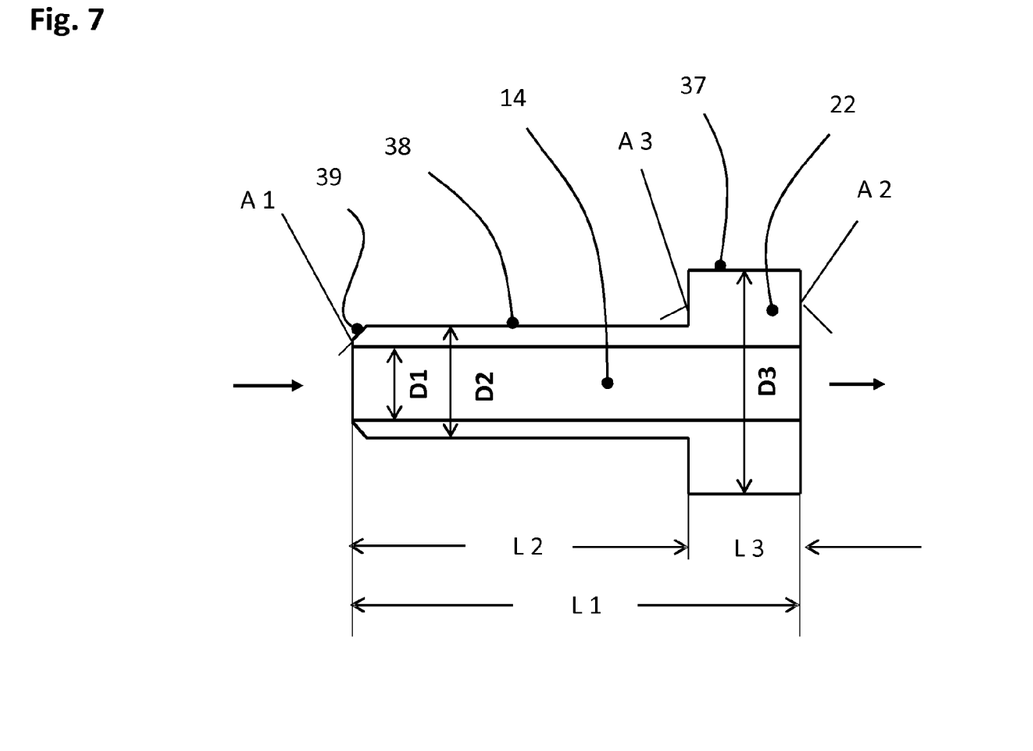
FIG. 7 illustrates a sectional view of a piston for a shut-off valve in accordance with embodiments.

FIG. 7 illustrates a piston 22 of the shut-off valve SV, 120 in accordance with embodiments in detail by way of example. The piston 22 may have an overall length L1 may have two sections having different outside diameters D2 and D3. A first piston section may have a first effective piston surface A1 formed normally to the axis of the piston 22, a sealing edge 39 formed as a bevel on an edge of the piston, and a first sliding surface 38 with the length L3 and an outside diameter D2. A second piston section may have a second effective piston surface A2, a support A3 for the spring 23 and a second sliding surface 37 with the length L3 and an outside diameter D3. The connecting channel 14 is in the form of an axial bore over the entire length L1 of the piston 22 and may have an inside diameter D1. The connecting channel 14 connects the two effective piston surfaces A1, A2 and medium flows through the connecting channel 14, corresponding to an embodiment of the valve housing 20 and the operating state of the shut-off valve SV, 120.

In each embodiment in which a sealing body 21 is used, the sealing body 21 has to be sealed off from the valve housing 20 for safety reasons so that no additional forces may arise and act on the sealing edge 39 of the piston 22.

In accordance with embodiments, the designation of vehicle includes, for example, motor vehicles, rail vehicles, and also watercraft and aircraft. All of the pressure values stated are by way of example and do not in any way limit the invention and the pressure range for which embodiments is claimed.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

10 Intake opening
11 Outlet opening
12 Relief opening
13 Passage opening
14 Connecting channel
17 Valve chamber, inlet region
18 Valve chamber, relief region
19 Valve chamber, accumulator region
20 Valve housing
21 Sealing body
22 Piston
23 Spring
24 Cover
25 Spacer
28 Nonreturn valve
29 Filter
37, 38 Sliding surfaces
39 Sealing edge
41, 42, 43 Sealing elements
50 Accumulator valve block with pressure regulator
60 Vehicle body
65 Tank neck
66 Pressure lines
70 Tank neck unit
100 Tank neck unit, mobile
110 Tank neck unit (fitted in vehicle)
112 Coloured identification means
114 Alpha-numerical identification means
120 (Mechanical) shut-off valve (SV)
122 Optical pressure indicator
124 Throughflow-limiting valve
125 Switching position "limited"
126 Switching position "open"
140 Throughflow path
141 Connector (mobile)
142 Tank neck (mobile)
155 Withdrawal location
165 Tank neck
A1, A2 Effective piston surfaces
A3 Support
D1 Inside diameter, connecting channel
D2, D3 Outside diameter, piston subsections
S Pressure accumulator vessel
SV Shut-off Valve
T Filling station (fuel-dispensing device)

What is claimed is:

1. A tank neck unit for a vehicle having a pressure accumulator system, comprising:
    a tank neck configured for a predetermined maximum pressure which is greater than a permissible operating pressure of the pressure accumulator system;
    a throughflow path;
    a nonreturn valve; and
    a shut-off valve arranged in the throughflow path between the tank neck and an outlet region, the shut-off valve being configured to prevent an increase in pressure of the pressure accumulator system beyond the permissible operating pressure, wherein the shut-off valve is purely mechanical, and is to close off a passage opening when a pressure of at least one pressure accumulator vessel of the pressure accumulator system exceeds a predetermined value, and which does not open due to either a further increase in pressure at the intake region, or a further decrease in pressure at the intake region.

2. The tank neck unit of claim 1, wherein the shut-off valve comprises:
    a valve housing;

a valve chamber having an accumulator region, an intake opening and an outlet opening facing at least one pressure accumulator vessel of the pressure accumulator system;

a piston having at least one axial connecting channel, a first effective piston surface facing an inlet region of the valve chamber and a second effective piston surface adjacent to the accumulator region;

at least one spring; and sealing elements configured to guide the piston in an axially moveable manner in the valve chamber.

3. The tank neck unit of claim 2, wherein one of the sealing elements and the valve housing form a valve seat.

4. The tank neck unit of claim 3, wherein a change in pressure in the accumulator region causes the axial movement of the piston and also causes an opening and closing of a passage opening arranged between the intake opening and the outlet opening.

5. The tank neck unit of claim 4, wherein in an unpressurized state, the passage opening is kept open by the spring.

6. The tank neck unit of claim 5, wherein the first effective piston surface and a sealing body in the valve chamber or the valve housing of the shut-off valve are configured such that, in a closed position of the piston, a sealing effect occurs at a sealing edge in a region of an outer border of the first effective piston surface.

7. The tank neck unit of claim 5, wherein a shut-off pressure of the shut-off valve corresponds to the spring force of the spring and the first and second effective piston surfaces.

8. The tank neck unit of claim 1, further comprises a pressure control valve arranged in a common housing with the shut-off valve.

9. The tank neck unit of claim 1, wherein the shut-off valve is arranged in the throughflow path directly downstream of the nonreturn valve.

10. The tank neck unit of claim 1, wherein the tank neck unit is fixedly connected to the vehicle and the tank neck is arranged on an outer side of the vehicle.

11. The tank neck unit of claim 1, wherein an outlet opening of the shut-off valve is connected via a pressure line to the pressure accumulator system, and the shut-off pressure of the shut-off valve is defined by a permissible operating pressure of the pressure accumulator system.

12. The tank neck unit of claim 1, wherein:
the tank neck unit is configured as a mobile adapter; and
the tank neck is arranged on a filling-station side of the tank neck unit.

13. The tank neck unit of claim 12, further comprising a connector to connect the tank neck unit to the vehicle, the connector having mechanical dimensions that are defined by a shut-off pressure of the shut-off valve.

14. The tank neck unit of claim 1, further comprising a switchable throughflow-limiting valve mounted in the throughflow path upstream of the shut-off valve.

15. The tank neck unit of claim 1, further comprising a pressure indicator configured to respond to and/or indicate when a maximum shut-off pressure of the shut-off valve is reached.

16. The tank neck unit of claim 1, further comprising a visual coding device configured to indicate a type of permissible fuel and/or a shut-off pressure of the shut-off valve.

17. The tank neck unit of claim 1, further comprising a visual identification device configured to indicate a type of permissible fuel and/or a predetermined maximum pressure and/or the shut-off pressure of the shut-off valve.

18. A tank system for a vehicle, comprising:
a pressure accumulator;
a tank neck unit operatively connected to the pressure accumulator, the tank neck unit having:
a tank neck configured for a predetermined maximum pressure which is greater than a permissible operating pressure of the pressure accumulator;
a throughflow path;
a nonreturn valve; and
a shut-off valve arranged in the throughflow path between the tank neck and an outlet region, the shut-off valve being configured to prevent an increase in pressure of the pressure accumulator beyond the permissible operating pressure, wherein the shut-off valve is purely mechanical, and is to close off a passage opening when a pressure of the pressure accumulator exceeds a predetermined value, and which does not open due to either a further increase in pressure at the intake region, or a further decrease in pressure at the intake region; and
a withdrawal location downstream of the shut off valve.

* * * * *